United States Patent [19]

Larson

[11] Patent Number: 4,587,750
[45] Date of Patent: May 13, 1986

[54] AIR SCOOP MOUNTED ON SNOW PLOW

[76] Inventor: Duane Larson, P.O. Box 3265, Mankato, Minn. 56001

[21] Appl. No.: 690,307

[22] Filed: Jan. 10, 1985

[51] Int. Cl.[4] .................... E01H 5/00; B60K 11/00
[52] U.S. Cl. ................................ 37/241; 37/266; 180/68.1
[58] Field of Search ............ 37/266, 241, 79; 180/68.1, 68.2; 296/1 S; 98/44; 172/701.1; 110/310; 126/99 D

[56] References Cited

U.S. PATENT DOCUMENTS

| | | | |
|---|---|---|---|
| 1,104,802 | 7/1914 | Hupp | 180/68.1 |
| 2,085,996 | 7/1937 | Phillips | 37/42 |
| 2,358,663 | 9/1944 | Scott-Iversen | 180/68.2 |
| 2,785,620 | 3/1957 | Welch | 98/2 |
| 2,856,704 | 10/1958 | Hebert | 37/79 X |
| 3,432,947 | 3/1969 | Peitl | 37/42 |
| 3,438,454 | 4/1969 | Rickel et al. | 180/68.1 |
| 3,819,000 | 6/1974 | Larsen | 180/68.1 X |
| 3,827,521 | 8/1974 | Welsh | 180/68.1 |
| 3,828,879 | 8/1974 | Harkey et al. | 180/68.1 |
| 3,946,646 | 3/1976 | Gassner, Jr. | 98/2 |
| 4,024,922 | 5/1977 | Ronald | 172/701.1 X |
| 4,345,641 | 8/1982 | Hauser | 165/41 |

*Primary Examiner*—Clifford D. Crowder
*Attorney, Agent, or Firm*—Kinney & Lange

[57] ABSTRACT

An air scoop arrangement is used to direct air towards a radiator of a vehicle carrying a front mounted snow plow blade. The air scoop includes an air engaging wall and oppositely disposed side walls depending therefrom. The air scoop is mounted on the snow plow blade in an adjustable angular orientation. The air engaging wall is substantially disposed above an upper end of the snow plow blade to engage and direct air towards the vehicle radiator.

4 Claims, 5 Drawing Figures

U.S. Patent
May 13, 1986
4,587,750
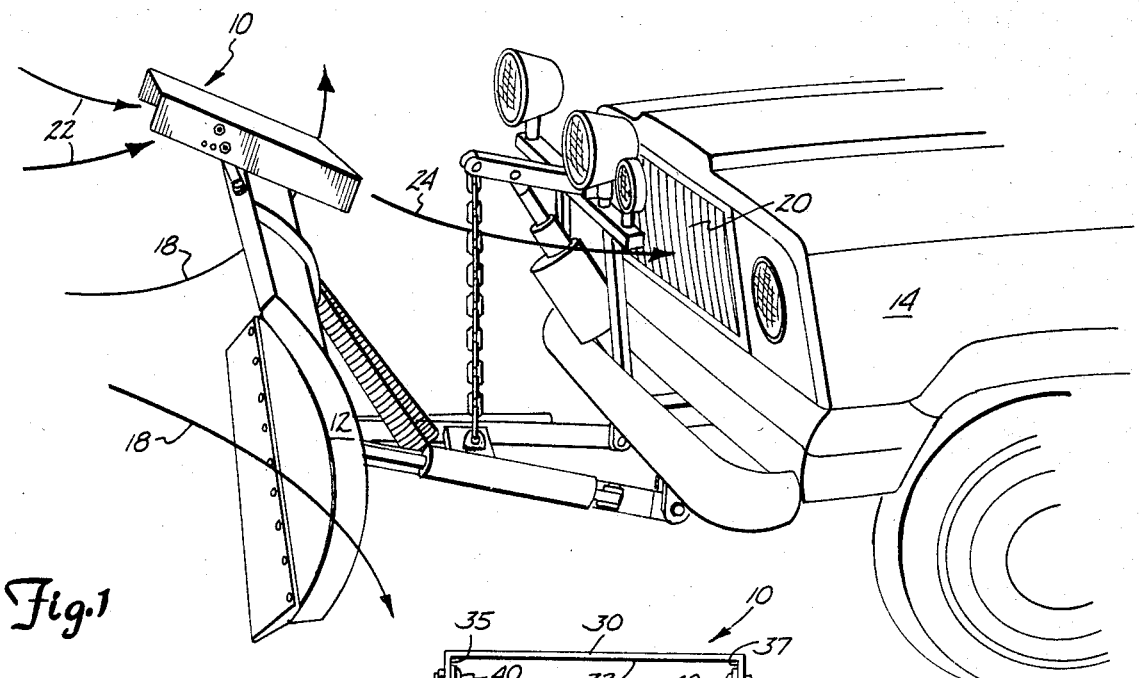
Fig.1
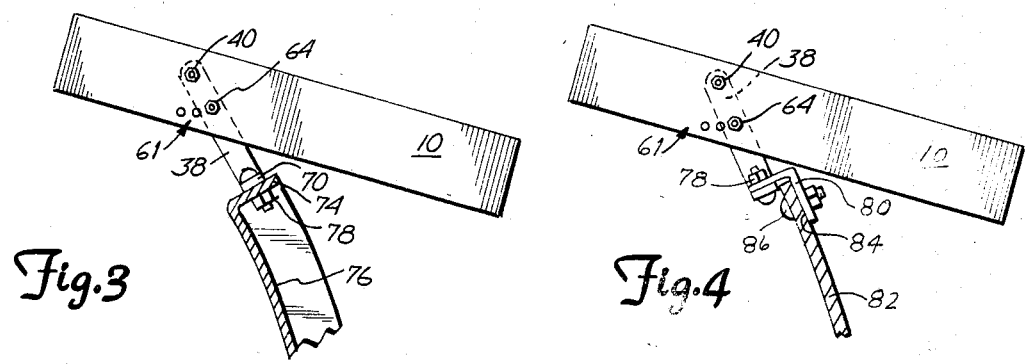
Fig.2
Fig.3
Fig.4
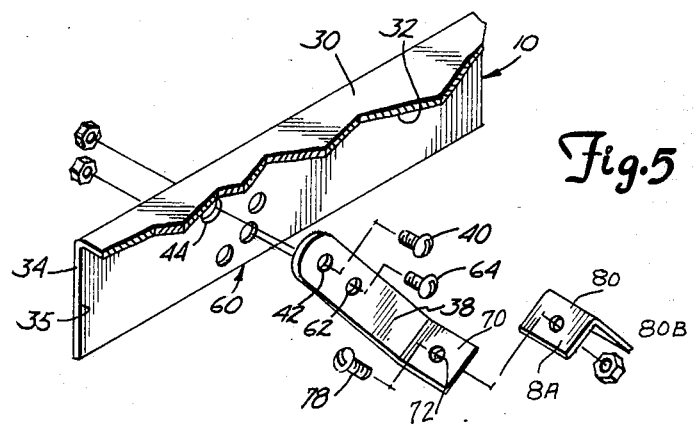
Fig.5

AIR SCOOP MOUNTED ON SNOW PLOW

BACKGROUND OF THE INVENTION

1. Field of the Invention

The present invention relates generally to an air scoop secured to a front mounted snow plow blade carried by a motor vehicle, to direct an air stream towards the vehicle radiator.

2. Description of the Prior Art

Front mounted snow plow blades carried by motor vehicles are very popular in geographical areas which receive a great deal of snow. Although the front mounting of the snow plow blade has many advantages when plowing snow, it has a major drawback when being carried in a non-plowing or transport position. In a transport position, the snow plow blade is typically aligned in front of the vehicle, blocking the air flow to the vehicle radiator. Since an air flow through the radiator is necessary to cool the water flowing therethrough, this blockage of the air flow frequently causes the vehicle to overheat, particularly on warmer days. Overheating of the motor vehicle can result in damage to the internal parts of the vehicle.

U.S. Pat. No. 3,432,947 to Peitl describes a snow deflector for directing the snow blown over the blade into the ground, away from the vehicle operator's line of vision. Similarly, U.S. Pat. No. 2,085,996 to Phillips discloses a snow plow deflector which prevents the wind from blowing snow, moved by the snow plow blade, into the vehicle's radiator or over the windshield. Both deflectors are arranged to direct snow away from the front of the vehicle, and are operative when the snow plow blade is being used to plow snow.

SUMMARY OF THE INVENTION

The present invention is an air scoop mountable on a snow plow blade to direct air towards the vehicle radiator when the snow plow blade is being carried in a transport position. The air scoop arrangement includes an air channeling member having an air engaging wall and a pair of side walls extending from opposite edges of the air engaging wall. The air channeling member is mounted on an upper end of the snow plow blade with most of the air engaging wall projecting above the upper end of the snow plow blade. When the vehicle is being driven down the road, the channeling member will engage a portion of the air flowing over the snow plow blade and direct it towards the vehicle radiator.

BRIEF DESCRIPTION OF THE DRAWINGS

FIG. 1 is a perspective view of the air scoop arrangement of the present invention, mounted on a front mounted snow plow blade being carried by a motor vehicle in a transport position;

FIG. 2 is a front view of the air scoop attached in adjustable angular relation to a pair of mounting brackets;

FIG. 3 is a side view of the air scoop mounted on a snow plow blade having an upper flange;

FIG. 4 is a side view of the air scoop mounted on a back side of an upper end of a snow plow blade not having the flange arrangement of FIG. 3; and FIG. 5 is an exploded view of a portion of the air scoop of the present invention secured to the support bracket in adjustable angular relation.

DETAILED DESCRIPTION OF THE PREFERRED EMBODIMENTS

An air scoop made according to the present invention is generally indicated at 10 in FIG. 1, secured to a front mounted vehicle snow plow blade 12. Snow plow blade 12 is illustrated as being carried by a vehicle 14 in a transport position, with the blade 12 held off the ground, substantially aligned in front of the vehicle 14. As indicated by arrows 18, snow plow blade 12 blocks the natural air flow to the vehicle radiator 20 when held in the transport position. This can cause the vehicle 14 to overheat, and subsequently damage internal working parts of the vehicle.

Air scoop 10, when mounted on the snow plow blade 12, assures a continuous flow of air to the vehicle radiator 20 while the vehicle 14 is moving. As vehicle 14 is being driven down the road, air striking the air scoop 10, indicated by arrow 22, is directed towards the vehicle radiator 20, as illustrated by arrow 24.

Air scoop 10 includes an air engaging wall or plate 30 having an air engaging surface 32 as shown in FIG. 2. A pair of substantially parallel, planar side walls or plates 34 and 36 extend from opposite edges of air engaging wall 30. Side walls 34 and 36 preferably have the same dimensions and define substantially planar inner air engaging surfaces 35 and 37 respectively, and are preferably perpendicularly disposed with respect to engaging wall 30 to define a three sided, open ended air channel. Air scoop 10 is preferably a unitary structure formed or bent in the shape indicated. This unitary structure is relatively inexpensive and easy to manufacture.

Because of the numerous variety of snow plow blades and motor vehicles on which they may be mounted, it is necessary to provide a means for mounting the air scoop 10 on any snow plow blade so that air is directed towards the vehicle radiator. With Applicant's air scoop 10, this adjustment is provided my means of support brackets 38, which are adjustably pivotally attached to air scoop 10.

As shown in FIG. 2, each side wall (34 and 36) of air scoop 10 is pivotally mounted on one end of a support bracket 38 by a bolt 40 or other suitable means. A bolt 40 extends through an aperture 42 located in each support bracket 38, aperture 42 being axially aligned with an aperture 44 defined through each of the side walls 34 and 36. When bolts 40 are properly tightened, rotation of air scoop 10 with respect to the support brackets 38 may be resisted, but not prohibited.

To secure air scoop 10 in a given angular relation with respect to support brackets 38, each of the side walls 34 and 36 are arranged with an array of apertures 60 and 61, respectively (with apertures 50 illustrated in FIG. 5 and apertures 61 illustrated in FIGS. 2 and 3). Apertures 60 are equidistantly spaced from the support arm pivot axis defined by bolts 40. It is also preferred that the apertures in array 61 of side wall 34 are axially aligned with a corresponding aperture in array 60 located on side wall 36. A second aperture 62 also located in each of the support brackets 38, is spaced at the same distance from the pivot axis as are each of the apertures in arrays 60 and 61. When apertures 62 are axially aligned with a pair of corresponding apertures in aperture arrays 60 and 61, a second bolt 64 is inserted through each of the aligned apertures to fix the position of air scoop 10 with respect to the brackets 38.

Because snow plow blades differ in their construction, support brackets 38 are arranged to be readily secured to most types of snow plow blade. At a second end of each support bracket 38 is a perpendicularly disposed flange 70, including an aperture 72. To mount air scoop 10 on a snow plow blade having an upper flange, as indicated by upper flange 74 on snow plow blade 76 in FIG. 3, one only needs to drill two properly spaced holes through the snow plow blade flange 74. A third bolt 78 may then be used to fix the support brackets 38 to upper flange 74. As shown in FIG. 2, support brackets 38 are fastened to a snow plow blade with the flanges 70 facing in opposite directions for stability.

The holes drilled through the upper flange 74 of snow plow blade 76 should be oriented such that the side walls 34 and 36 of air scoop 10, when mounted on the snow plow blade, are disposed in substantially parallel alignment with the direction of travel of the vehicle. In this orientation, the greatest volume of air may be directed to the air scoop towards the vehicle radiator, with a minimum of drag or deflection of the air flow lby the side walls 34 and 36. As is seen in FIG. 3, virtually all of the air engaging surface 32 is disposed above the top of the snow plow blade, so that a maximum amount of air may be engaged and directed by the air scoop 10 towards the vehicle radiator 20.

Since not all snow plow blades have an upper flange as indicated in FIG. 3, a second connecting member 80, as illustrated in FIG. 4, has been provided. To mount air scoop 10 to snow plow blade 82, it is first necessary to attach the substantially right angled connecting member 80 to flange 70 with bolt 78. As illustrated in FIG. 4, a first leg 80A of connecting member 80 supports bracket 38 in a substantially upright position. A second leg 80B of connecting member 80 is fastened to the back side of snow plow blade 82 by a fourth bolt 86. Again, air scoop 10 should be mounted on snow plow blade 82 such that side walls 34 and 36 are substantially parallel to the vehicle direction of travel, and with most, if not all, of the engaging surface disposed above the uppermost edge of snow plow blade 82.

To mount air scoop 10 on a snow plow blade, the snow plow blade should first be raised to its transport position. Air scoop 10 should be pivotally mounted to support brackets 38 and temporarily angularly fixed in position by bolt 64. If connecting members 80 are required to properly mount the air scoop 10, they should also be connected to brackets 38. When all necessary brackets have been attached, air scoop 10 is positioned on top of the snow plow blade such that side walls 34 and 36 are substantially parallel to the vehicle direction of travel and air scoop 10 is substantially aligned in front of the vehicle radiator. The position of the holes which are to be drilled through the snow plow blade should then be marked and drilled. The brackets should then be secured to the snow plow blade and air scoop 10 adjusted for the proper angular orientation which will direct air into the vehicle radiator as the vehicle is traveling down the road.

The universal mounting arrangement of the present invention is inexpensively made and easily mounted on or removed from any snow plow blade, and does not interfere with the operation of the snow plow blade when in a plowing position.

Although the present invention has been described with reference to preferred embodiments, workers skilled in the art will recognize that changes may be made in form and detail without departing from the spirit and scope of the invention.

What is claimed is:

1. An air scoop arrangement for use with a snow plow blade arranged to be front mounted on a motor vehicle, comprising:

air channeling means including an air engaging wall and a pair of side walls extending from opposite edges of the engaging wall, mountable on the snow plow blade with the air engaging wall substantially disposed above a topmost edge of the snow plow blade to engage and direct air towards a radiator carried by the vehicle;

bracket means for mounting the air channeling means in adjustable angular relation on the snow plow blade, the bracket means includes a pair of support arms, each having a first end secured to the snow plow blade and a second end rotatably mounted about an axis to the side walls of the air channeling means; and means for releasably fixing the orientation of the air channeling means with respect to the bracket means including:

a first aperture located within the support arm at a predetermined distance from the pivot axis;

an array of second apertures located within each side wall of the air channeling means, each second aperture in each array being spaced at the same distance from the support arm pivot axis as the support arm aperture, such that each first aperture can be axially aligned with any one of the second apertures in the array defined by the side wall to which the support arm is pivotally attached; and bolt means extending through the first aperture and one of the second apertures with which it is axially aligned, for releasably fixing the air channeling means in a selected orientation with respect to the snow plow blade.

2. The air scoop arrangement of claim 1 wherein the side walls are parallel and are substantially perpendicularly disposed with respect to the engaging wall.

3. The air scoop arrangement of claim 1 wherein the side walls define substantially planar inner air engaging surfaces which are substantially perpendicularly aligned with a planar, inner air engaging surface defined by the air engaging wall.

4. The air scoop arrangement of claim 1 wherein the side walls and air engaging wall are of integral construction.

* * * * *